United States Patent [19]

Hartmann

[11] Patent Number: 4,715,246

[45] Date of Patent: Dec. 29, 1987

[54] THREE SPEED CHAINLESS PLANETARY TRANSMISSION FOR PEDAL-POWERED VEHICLES

[76] Inventor: Dirck T. Hartmann, 4121 Morningstar Dr., Huntington Beach, Calif. 92649

[21] Appl. No.: 848,236

[22] Filed: Apr. 4, 1986

[51] Int. Cl.$^4$ ............................ B62M 1/08; F16H 3/44
[52] U.S. Cl. .................................. 74/594.2; 74/750 B; 280/236; 280/238; 280/260
[58] Field of Search ...................... 74/750 B, 760, 761, 74/781 B, 594.2; 280/260, 238, 236

[56] References Cited

U.S. PATENT DOCUMENTS

| | | |
|---|---|---|
| 619,118 | 2/1899 | Barnes . |
| 707,359 | 8/1902 | Scharbach . |
| 1,184,321 | 5/1916 | Chapin . |
| 1,506,565 | 8/1924 | Clatworthy . |
| 1,798,384 | 3/1931 | Roberds . |
| 2,505,464 | 4/1950 | Debuit . |
| 3,372,608 | 3/1968 | Gleasman ........................ 74/750 R |
| 3,863,503 | 2/1975 | Loeb et al. . |
| 3,908,807 | 9/1975 | Ozaki et al. ...................... 74/750 B |
| 3,920,263 | 11/1975 | Bundschuh . |
| 3,934,481 | 1/1976 | Foster . |
| 3,934,493 | 1/1976 | Hillyer ............................ 74/750 B |
| 3,955,444 | 5/1976 | Munn ............................... 74/750 B |
| 3,995,503 | 12/1976 | Schulz ............................. 74/750 B |
| 4,052,914 | 10/1977 | Nakajima ........................ 74/750 B |
| 4,065,984 | 1/1978 | Nakajima ........................ 74/750 B |
| 4,069,725 | 1/1978 | Segawa ............................ 74/750 B |
| 4,179,953 | 12/1979 | Hanada et al. .................. 74/750 B |
| 4,447,068 | 5/1984 | Brooks . |
| 4,583,427 | 4/1986 | Blattmann ....................... 74/750 B |

FOREIGN PATENT DOCUMENTS

| | | |
|---|---|---|
| 0158466 | 3/1985 | European Pat. Off. . |
| 2610644 | 3/1976 | Fed. Rep. of Germany . |
| 457860 | 6/1950 | Italy ................................. 74/750 B |
| 738338 | 10/1955 | United Kingdom ............. 74/750 B |

*Primary Examiner*—Gary L. Smith
*Assistant Examiner*—Carl M. DeFranco, Jr.

[57] ABSTRACT

A three-speed planetary transmission which mounts inside the wheel hub concentric with the pedal drive shaft on the axis of the driving wheel of a vehicle such as a tricycle taxi. The transmission is characterized by three planet gears mounted in bearings on a gear carrier fitting driven by the pedal drive shaft. Rotatable sun and ring gears, which can be selectively locked against rotation, are in constant mesh with the planet gears. Conventional free-wheel ratchet mechanisms transfer torque from the sun and ring gears to the wheel hub. Two low gear ratios are provided to facilitate initial movement of a heavily loaded vehicle. The simplified gear shift, low maintenance, and compact nature of this chainless three speed transmission provide an improved alternative to the conventional three-speed chain drive for heavily loaded tricycles.

4 Claims, 8 Drawing Figures

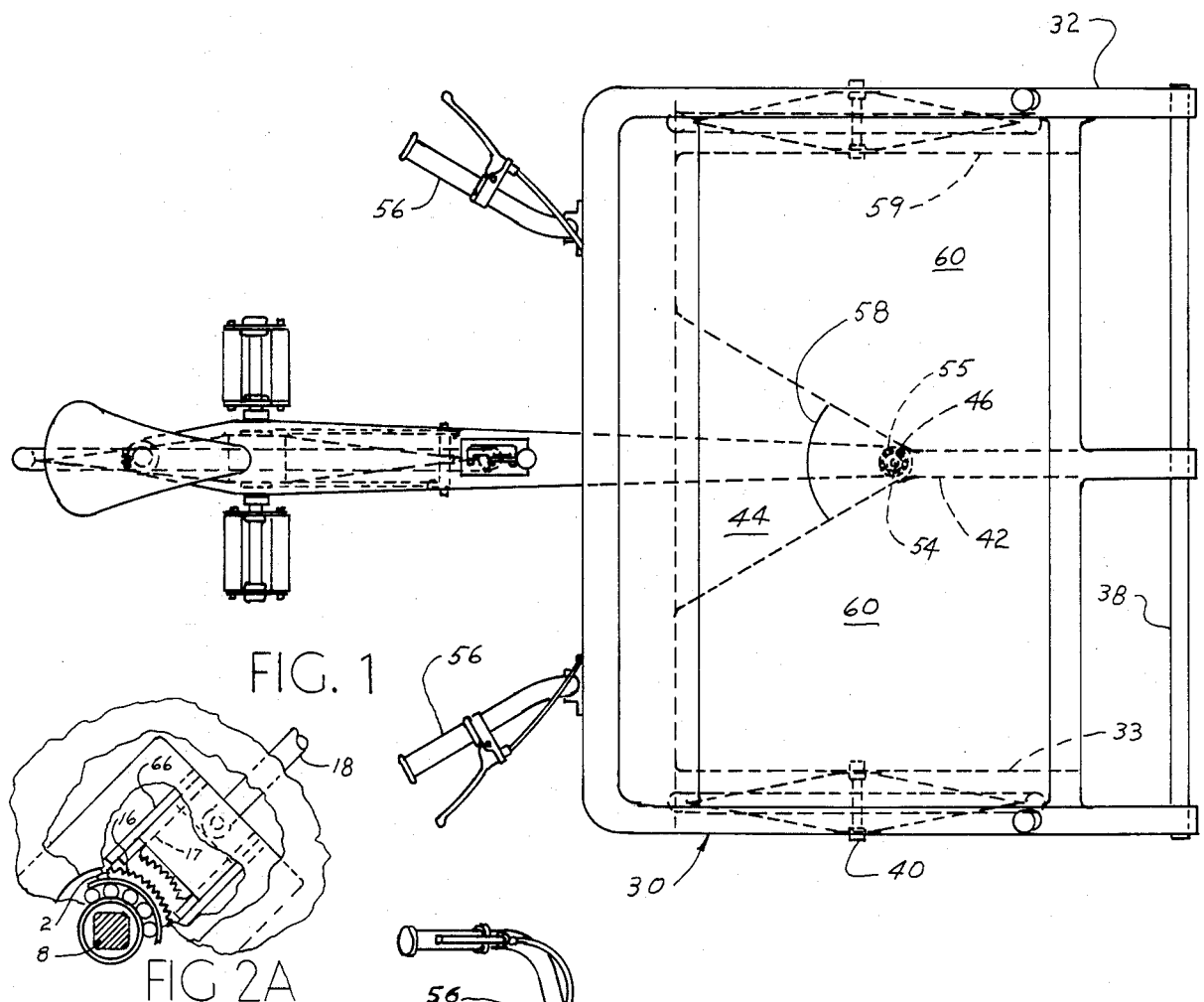
FIG. 1
FIG. 2A
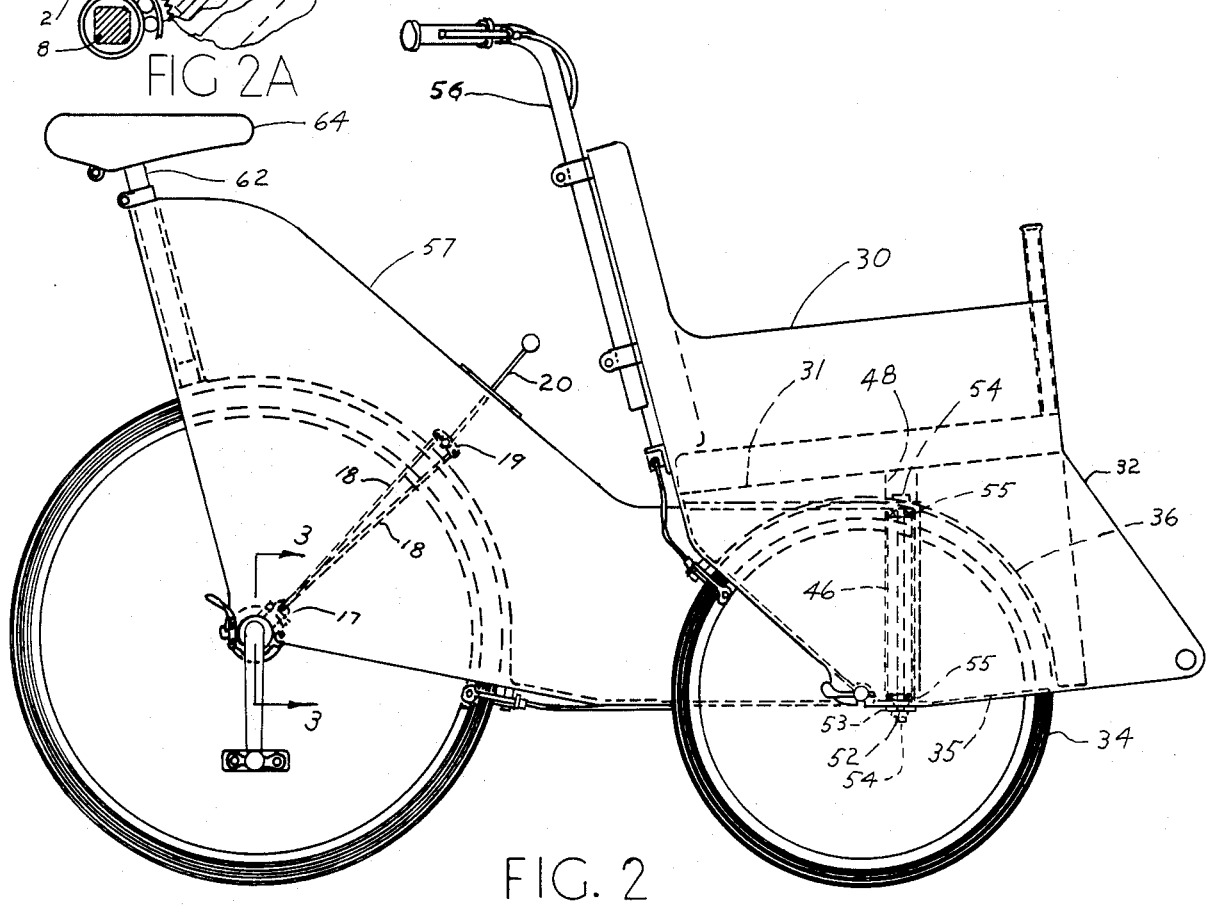
FIG. 2

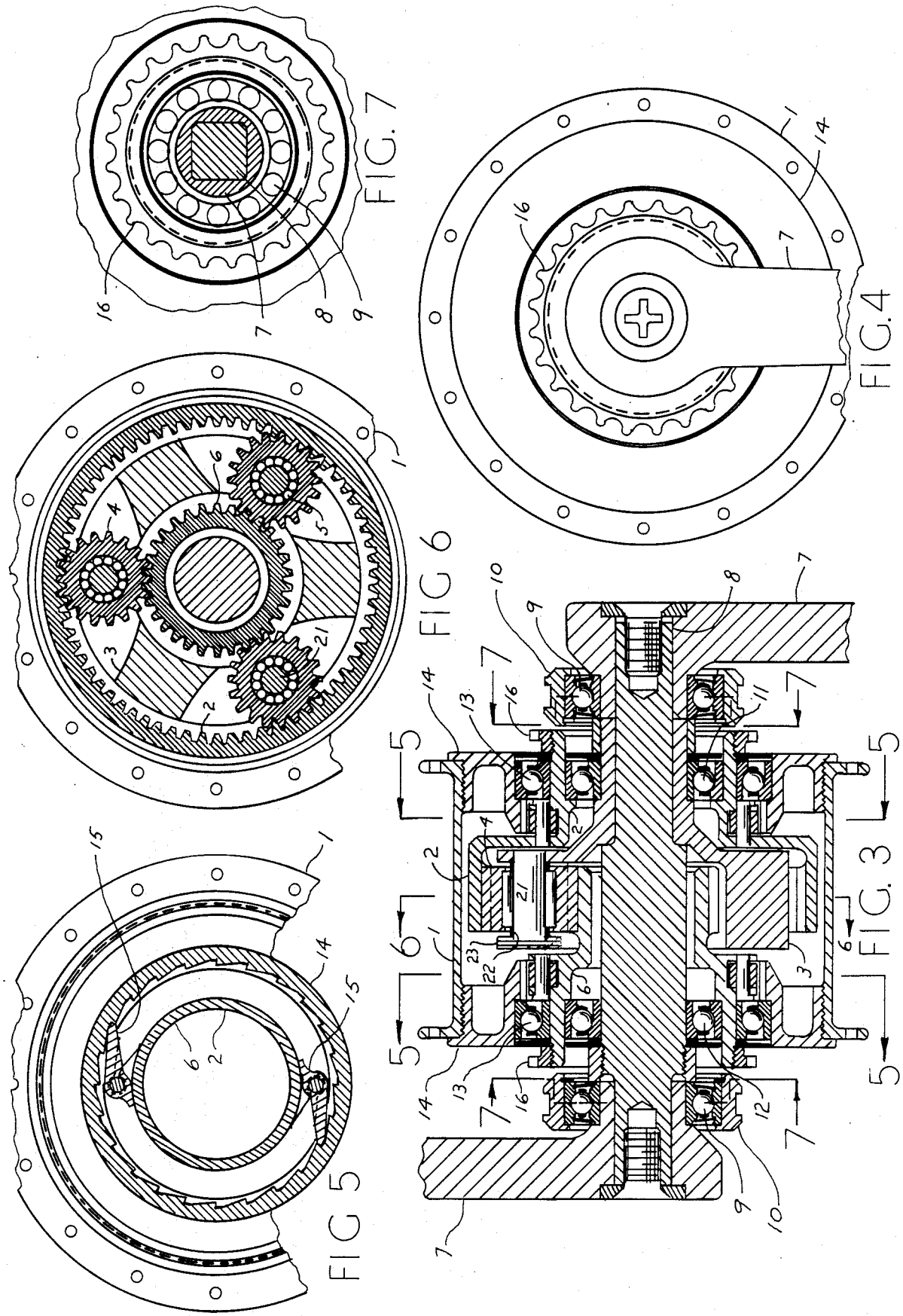

THREE SPEED CHAINLESS PLANETARY TRANSMISSION FOR PEDAL-POWERED VEHICLES

BACKGROUND OF INVENTION

1. Field of Invention

The present invention relates to a chainless planetary transmission for a pedal-powered vehicle such as a two passenger tricycle taxi.

2. Description of the Prior Art

The conventional three speed bicycle drive is characterized by a pedal and crank assembly which rotates a pedal sprocket to drive a chain for rotating a rear sprocket coupled to the wheel hub. The rear sprocket drives a planetary gear system inside the wheel hub. The pedal sprocket is typically three times larger than the rear sprocket, and a planetary gear system typically multiplies the sprocket ratio by ¾ for first gear, by 1.0 for second gear and by 4/3 for third gear.

The chain for the conventional three-speed drive requires periodic cleaning and oiling for efficient operation and must be removed to change the rear tire. Cleaning is particularly necessary in dusty areas to prevent hard pedaling and premature chain failure.

The chainless drive systems of the prior art are either impractical, excessively complex, or costly to manufacture and maintain. U.S. Pat. No. 2,505,464 entitled "Bicycle or Motorcycle Carrying A Single Steering Wheel and Transmission Gears and Connections Therefor", issued Apr. 25, 1950 to L. Debuit, is typical of one form of chainless drive. The drive is located on the driving wheel axis and concentric with the pedal shaft axis, but the transmission is not of the planetary type, and it is located outside the wheel hub. In addition, torque from the pedal drive shaft is transmitted through single gear teeth which require heavy gears to prevent early fatigue failure of the gear teeth.

SUMMARY OF THE INVENTION

According to the present invention, a compact, durable low maintenance transmission is provided having gear ratios low enough to permit transporting a heavy payload up a grade without excessive pedal torque while also providing a gear ratio high enough to permit sufficient velocity without excessive pedal speed. The transmission includes a gear shift which is simple and not easily subject to damage so the invention will be practical for rental vehicles. The transmission in accordance with the present invention comprises a pedal drive shaft on the axis of rotation of the wheel hub, a planetary gear carrier mounted on and driven by the pedal drive shaft, a plurality of planetary gears carried by the gear carrier, a sun gear in meshing relation with the planetary gears, a pair of conventional free-wheel mechanisms between the hub and the sun and ring gears, respectively, and a gear shift means for selectively locking either the sun gear or the ring gear to the vehicle frame, or leaving both free to rotate. When the sun gear is locked, the planet gears drive the ring gear at a multiplied rate of speed. When the ring gear is locked, the planet gears drive the sun gear at a higher multiplied rate of speed. When both the sun and the ring gears are free to rotate, the planet gears drive them both at the pedal speed.

The transmission is arranged within the hub in compact form. It is relatively simple to manufacture and maintain and is sized for low working stresses to permit many years of hard service with little maintenance. The transmission is applicable to bicycles, as well as the tricycle taxi shown using the present invention.

Other aspects and advantages of the present invention will become apparent from the following more detailed description taken in conjunction with the accompanying drawings.

BRIEF DESCRIPTION OF THE DRAWINGS

FIG. 1 is a top plan view of a two passenger tricycle taxi with the present three-speed transmission in its rear wheel;

FIG. 2 is a side elevation view of the vehicle of FIG. 1;

FIG. 2A is an enlarged partial view of the means for selectively locking the sun and ring gears;

FIG. 3 is a view of the transmission taken along the line 3—3 of FIG. 2, with the transmission shown separated from the vehicle for clarity;

FIG. 4 is an end elevational view of the transmission;

FIG. 5 is a partial view taken along either of the lines 5—5 of FIG. 3;

FIG. 6 is a partial view taken along the line 6—6 of FIG. 3; and

FIG. 7 is a partial view taken along either of the lines 7—7 of FIG. 3

DESCRIPTION OF THE PREFERRED EMBODIMENT

Referring to FIG. 3, the three-speed planetary transmission in accordance with the present invention includes a pedal drive shaft 8 on the axis of the wheel hub 1. The pedal drive shaft has square ends for the transfer of torque from the pedal crank arms 7. Mounted on the necks of the crank arms are ball bearings 9 on which the frame engagement fittings 10 are retained with snap rings. Mounted inboard of the crank arm on the right side is the planet gear carrier fitting 3 on which are mounted the three planet gears 4. Mounted on a bearing 11 on the neck of the carrier fitting and in constant mesh with the planet gears is the ring gear 2. Mounted on a ball bearing 12 is the sun gear 6, also in constant mesh with the planet gears. Mounted on ball bearings 13 on the necks of the sun and ring gears are the hub drive fittings 14. The drive fitting on the right side is installed in the wheel hub with right hand threads and the drive fitting on the left side with left hand threads so that the drive torque is tightening. As best seen in FIG. 5, spring loaded dogs 15 are installed on steel pins in both the ring and sun gears and engage the cogs machined in the drive fittings to provide the freewheel feature.

As best seen in FIG. 6, each of the three planet gears is mounted on twelve small rollers 5 which roll on the steel pin 21. Small integral shoulders on the planet gear maintain the position of the gear on the rollers, as seen in FIG. 3, and a small sleeve 22, installed between each end of the rollers and the wall of the carrier fitting 3, maintains the position of the rollers on the mounting pin 21. The spring pin 23 maintains the axial position of the mounting pin 21 in the planet gear carrier fitting 3.

Outboard of the wheel bearings 13, on the necks of both the sun and ring gears, as best seen in FIGS. 3 and 7, is the integral tooth form 16, provided for selectively locking the gears to the vehicle frame. As seen in FIG. 2, and in the enlarged view in FIG. 2A, a block 17 with a tooth form which mates with tooth form 16 is installed in a short track 66 on the vehicle frame on each side of the wheel. A push rod 18 links each block 17 with a rocker arm assembly 19. The forward push rod engages the block 17 on the left side for locking the sun gear 6, and the aft push rod engages the block 17 on the right side for locking the ring gear 2. The gear shift 20 actuates the rocker arm 19. With the gear shift in the centered position shown in FIG. 2, the ring and sun gears are both free to rotate as shown in FIG. 2A, providing the direct drive corresponding to first gear. With the gear shift lever 20 moved to the forward notch, the forward push rod 18 moves the block 17 on the left side into engagement with the sun gear locking teeth preventing it from rotating and providing second gear. With the gear shift lever 20 moved to the aft notch, the aft push rod 18 on the right side engages the locking teeth on the right side block 17 with the ring gear preventing it from rotating and providing third gear.

When the sun gear is locked, the gear ratio is equal to $(N+n)/(0.5N+n)$, where N is the number of teeth in the sun gear and n is the number of teeth in the planet gear. When the ring gear is locked, the gear ratio is equal to $(N+n)/(0.5N)$.

In the example design prepared to illustrate this invention, 32 pitch gears were selected with 33 teeth for the sun gear, 24 teeth for the planet gears, and 81 teeth for the ring gear with a pitch diameter for the ring gear of 2.531 inches. The resulting gear ratio with the sun gear locked is 1.407, and the gear ratio with the ring gear locked is 3.454. If the pitch diameter of the ring gear were increased to 3.0 inches with 96 teeth and 21 teeth were selected for the planet gears, the number of teeth in the sun gear would be 54 and the gear ratio with the sun gear locked would be 1.562, and the gear ratio with the ring gear locked would be 2.778. The invention thus permits considerable variation in the gear ratios selected. However, with three planet gears spaced 120 degrees apart on the planet gear carrier fitting, the number of teeth on both the sun and ring gears should be divisible by three, as noted in the example numbers cited for illustration. Also, the pitch diameter of the planet gear must be large enough to leave room for the bearing on which the planet gear is mounted. In the example design prepared to illustrate the invention, each planet gear is mounted on a roller bearing with 12 rollers each 0.093 inches in diameter. This bearing requires a 0.458 inch diameter hole in the planet gear and a 0.270 inch diameter steel pin engaging the gear carrier fitting. The small cageless roller bearing described will accommodate the most demanding service from the strongest riders, but a porous bronze bushing may be a satisfactory bearing for the planet gears for lighter riders and will require a smaller hole permitting the selection of smaller planet gears and a wider variation in possible gear ratios.

The vehicle of FIGS. 1 and 2 which has been used as an example of one application for the present transmission is a two passenger tricycle taxi. Such a taxi seats the passengers forward to provide an unobstructed view. In addition, the use of a chainless transmission permits the frame to be shorter so that a right turning radius is possible.

The vehicle comprises a forward or seat assembly 30 which may be made in the form of a molded shell having a seat wall 31, a bottom wall 35 and depending sides 32 which define the outside walls of a pair of wheel wells 33 for the pair of front wheels 34 of the vehicle.

The sides 32 are secured together by an arcuate shear web 36. A transverse foot rest 38 extends between the forward extremities of the sides 32. The lower portion of the sides 32 includes slots which fit over the front wheel axles 40.

The seat assembly 30 also includes a central, longitudinally directed web 42 which diverges outwardly in a rearward direction to provide a clearance space 44. The upper portion of the web 42 includes a depending well 48 and the lower portion includes a plate 53 bonded under the bottom wall 35.

The vehicle also includes a rearward frame portion fabricated in the form of the molded shell 57. Within the forward tubular portion 46 of the shell 57, the two ball bearings 55 are captive. These bearings engage a vertically oriented bolt 54, the head of which is in the well 48 in the seat assembly 30. The lower end of the bolt 54 projects through the plate 53 and is secured by the nut 52. this assembly is equivalent to the headset bearings which mount the front fork in the head tube of a conventional bicycle.

The seat assembly 30 is steered by pivoting the head bolt 54 within the bearings 55 by use of a pair of handle bars 56 attached to the upper side portions of the assembly 30, the pivotal relative movement taking place through the arc 58 within the clearance space 44.

The molded shell of the seat assembly 30 includes a pair of depending walls 59, parallel to the side walls 32, and defining the inner walls of the wheel wells 33. In addition, the walls 59, the seat wall 31 and the bottom wall 35 define a pair of storage spaces 60 on either side of the web 42. Access to the spaces 60 is gained by pivoting the seat wall 31 at one edge.

The lower portions of the walls 59 include recesses (not shown) to accommodate the inner extremities of the front wheel axles.

The frame 57 mounts the usual seat post 62 of a seat 64, the gear shift mechanism, and the rear wheel, together with the transmission described above. The seat post centerline passes generally through the center of the rear wheel.

While this invention has been described in terms of a few preferred embodiments, it is understood that persons skilled in the art of mechanical design, upon studying the drawings depicting this design, will realize many possible modifications. For example, two or four planet gears could be used on the gear carrier fitting instead of three, and plain bearings or ball bearings could be used for mounting the planet gears instead of the small cageless roller bearings shown; or a broached spline on the pedal drive shaft could be used for the transfer of torque from the pedal crank arms to the planet gear carrier fitting rather than the square shaft sections.

It is therefore intended that the following appended claims be interpreted as including all such modifications and alterations as fall within the true scope and spirit of the present invention.

I claim:

1. In a pedal-powered vehicle including a rotatable pedal drive shaft, a frame, and a driving wheel having a hub concentric with the axis of rotation of said drive shaft, an improved three speed, chainless transmission mounted within said hub and in concentric relation with the axis of rotation of said hub and comprising:
   planetary gear carrier means fixedly mounted to said drive shaft for rotation therewith;
   a plurality of externally toothed planetary gears rotatably carried by said carrier means and constrained against axial movement;

internally toothed ring gear means mounted in a fixed axial position on said drive shaft for concentric rotation about said drive shaft, and meshed with said planetary gears;

externally toothed sun gear means meshed with said planetary gears and supported in a fixed axial position on said drive shaft for concentric rotation about said drive shaft;

first free-wheel ratchet means coupled between said hub and said ring gear means for driving said hub, second free wheel ratchet means coupled between said hub and said sun gear means for driving said hub, said hub being driven by one of said ring gear means or said sun gear means or by both, or free wheeling independently of said ring gear means and said sun gear means, depending upon the direction and speed of rotation of said ring gear means and said sun gear means relative to said hub;

a pair of external locking means each being selectively and alternatively operable to lock one of said ring gear means or said sun gear means against rotation or to leave both free to rotate, said hub being driven by the unlocked one of said ring gear means or said sun gear means or by both;

said hub being driven at a selected rate of rotation depending upon whether the ring gear means or the sun gear means is free to rotate or both are free to rotate; and an external shift means for selectively operating one of said ring gear locking means or said sun gear locking means.

2. A transmission according to claim 1 wherein said pair of ratchet fittings support said hub.

3. A transmission according to claim 1 wherein said ring gear means comprises a ring gear rotatably supporting one of said pair of ratchet fittings, and wherein said sun gear means comprises a sun gear rotatably supporting the other of said pair of ratchet fittings, and wherein said planetary gear carrier means is located concentrically within said ring gear.

4. A transmission according to claim 3 wherein said vehicle is a rear wheel drive tricycle taxi, with two front wheels supporting a two passenger seat assembly rotatably coupled to a rear frame by bearings, handle bars rigidly fixed to said seat assembly, the centerline of a seat post passing through or near the center of said rear wheel, and the transmission of claim 4 located within the rear wheel hub.

* * * * *